Figure 1:
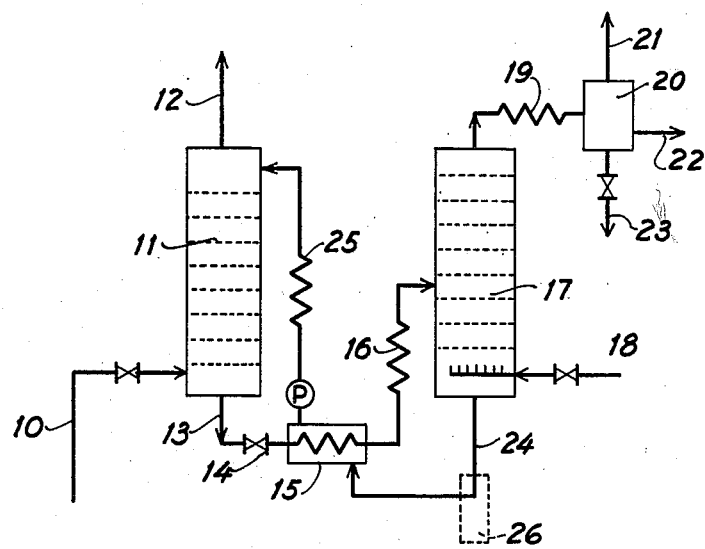

Oct. 6, 1942.    W. C. DAYHUFF ET AL    2,297,675
PROCESS FOR TREATING GASEOUS HYDROCARBONS
Filed Oct. 4, 1938    2 Sheets-Sheet 1

WALTER C. DAYHUFF
ROBERT B. BOWMAN
INVENTORS

BY
ATTORNEY

WALTER C. DAYHUFF
ROBERT B. BOWMAN
INVENTORS

Patented Oct. 6, 1942

2,297,675

UNITED STATES PATENT OFFICE 2,297,675

PROCESS FOR TREATING GASEOUS HYDROCARBONS

Walter C. Dayhuff, Whittier, and Robert B. Bowman, Concord, Calif., assignors to Standard Oil Company of California, San Francisco, Calif., a corporation of Delaware Application October 4, 1938, Serial No. 233,226

5 Claims. (Cl. 196—7)

This invention relates to a process for treating gaseous hydrocarbon mixtures and concerns primarily the treatment of natural gas, such as casing head gas containing natural gasoline fractions, preparatory to distribution in high pressure gas mains.

Difficulties have been encountered by the natural gas industry in transporting gas through pipe lines at elevated pressures. Service has been interrupted by the clogging of the distribution lines with a solid material which resembles snow. The "snow" accumulates in the distribution lines at low spots where the flow of the gas through the line tends to collect and compress the material until the line may become entirely plugged. The snow-like material comprises solid compounds formed by methane, ethane, propane and isobutane in the presence of water vapor at elevated pressures. These compounds are herein designated "gas hydrates."

The melting point of mixed gas hydrates formed in natural gas mixtures depends upon the pressure and has been found to vary from approximately 34° F. at 110 lbs. per sq. in. absolute to about 60° F. at 800 lbs. per sq. in. absolute pressure. Thus at high pressures, such as 400 to 500 lbs. per sq. in. utilized in various natural gas distributing systems, these gas hydrates may form at normal atmospheric temperatures considerably above the freezing point of water. It has also been observed that the extraction of the gasoline fractions from natural gas seems not to help the situation in that gas hydrates appear to form more readily in the lean gas stripped of liquefiable hydrocarbons than in the original wet gas rich in gasoline—other conditions being comparable.

Additional difficulties encountered in transporting gas through pipe lines at elevated pressures comprise severe corrosion under certain conditions attributable to the presence of an undue amount of water vapor in the gas and collection of water at low points in the line causing surging of the gas flow with the result that metering accuracy is impaired and the capacity of the line is reduced.

We have discovered that the above and other difficulties can be avoided or minimized by adopting certain changes in the process and apparatus conventionally used for extracting gasoline fractions from natural gases. In such conventional systems an absorption medium, such as a mineral oil fraction, is utilized for selectively removing the condensable or liquefiable hydrocarbons. The mixture of absorption medium and absorbed hydrocarbons is then distilled in the presence of open steam to recover the extracted gasoline fraction. We have found that this absorption medium contains dissolved water and that the medium should be desiccated to remove a major portion of its contained water before entering the absorption zone. The present invention involves novel and advantageous methods of removing both dissolved and suspended or emulsified water from the liquid absorption medium whereby the water content of the natural gas being treated may be retained at a point such that difficulties due to corrosion, water accumulation and formation of gas hydrates in distribution systems will be minimized.

Accordingly, an object of the invention is to provide a new and improved process for treating hydrocarbon gases.

Another object of the invention is to provide a new and useful process and apparatus for countercurrently extracting higher boiling hydrocarbons from the hydrocarbon gases and producing a gas which has been treated in a manner to minimize the corrosive action due to water.

Another object of the invention is to provide a new and useful process and apparatus for producing a treated gas which will not form gas hydrates under conditions normally encountered in high pressure distribution systems.

A further object is to provide a process and apparatus for treating a natural gas whereby the accumulation of free water in the distribution mains by condensation from the gas is precluded.

In the drawings:

Figure 1 is a diagrammatic flow sheet of a conventional absorption system for recovering gasoline from natural gas.

Figure 2:
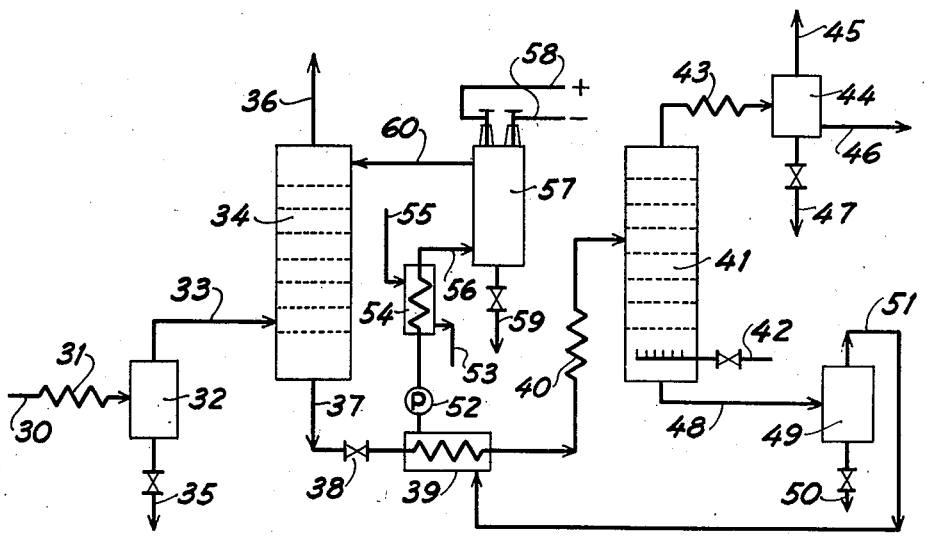

Figure 2 comprises a flow diagram of an embodiment of the present invention.

Figure 3:
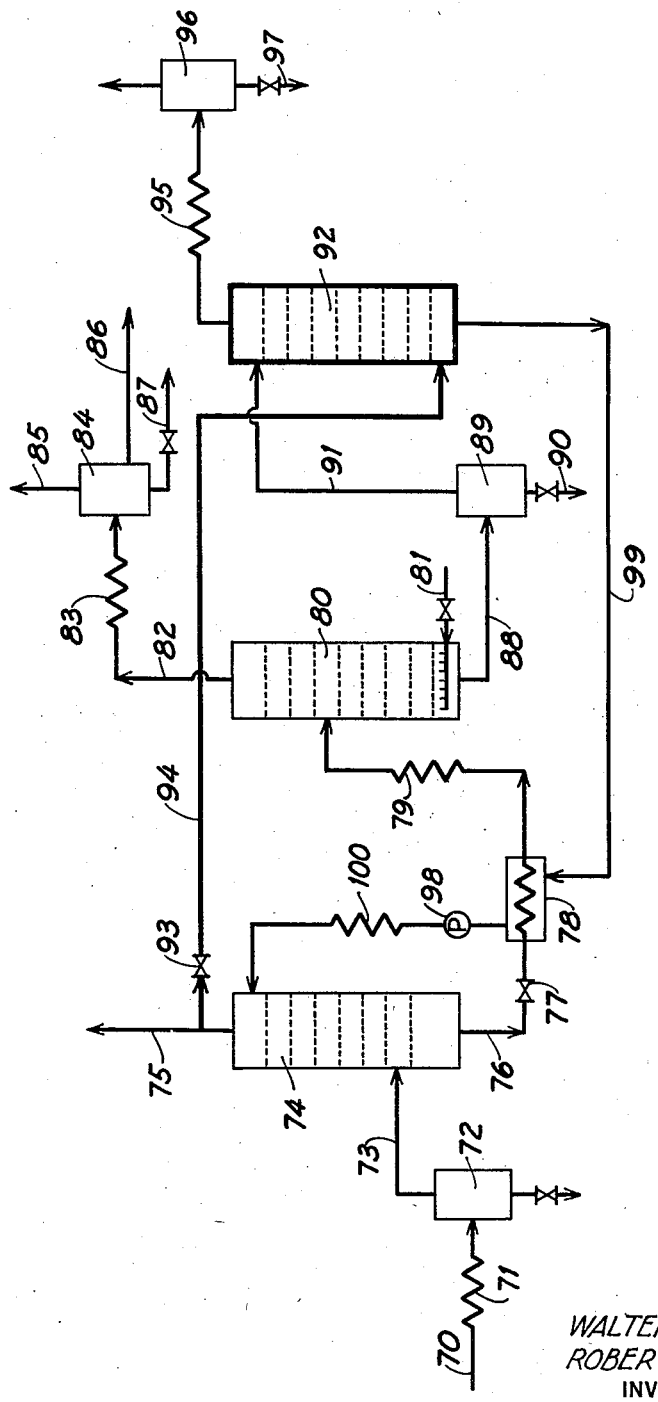

Figure 3 is a diagrammatic illustration of a second and preferred species of the invention.

In Figure 1 of the drawings, casing head gas or other mixtures of liquefiable and non-liquefiable hydrocarbons are admitted through valve controlled inlet line 10 to absorber column 11 where liquefiable gases, such as natural gasoline fractions, are dissolved in a liquid absorption medium flowing downwardly through the column. The unliquefiable gases flow upwardly and countercurrently to the absorption medium and finally pass out the top of the column through conduit 12 to a distributing pipe line.

The absorption medium together with its absorbed hydrocarbons flow from the bottom of column 11 by way of pipe 13, throttling valve 14, heat exchanger 15 and heater 16 to the stripper column 17. Open steam is introduced into the bottom of the stripper by valve controlled steam line 18. The absorption medium is stripped of its absorbed hydrocarbons which pass by way of condenser 19 to a three-way separator diagrammatically illustrated at 20. Unliquefiable gases are removed from the separator by line 21, condensable hydrocarbons by line 22, and condensed steam by pipe 23.

The stripped absorbing medium flows from the bottom of column 17 through line 24, heat exchanger 15 and cooler 25 to the top of absorption column 11 where it again absorbs liquefiable hydrocarbons from the upwardly flowing gases. It is to be noted that a gravity or other ordinary mechanical separator inserted in line 24 at the point illustrated in dotted lines 26 will not suffice for the purposes of the present invention in that such a separator fails to remove water in solution or in stable dispersion in the absorption medium.

In the conventional type of system, a mineral oil fraction, such as mineral seal oil, is commonly utilized as an absorbing medium and likewise comprises the preferred absorbing medium used in the present invention. However, other types of liquid absorbing media are not precluded and are comprehended within the broader aspects of the invention.

Water is ordinarily not considered to be soluble in oil. However, we have discovered that water is taken up by the mineral absorption oil in the steam distillation or stripping zone in quantities sufficient to materially raise the dew point temperature of the denuded natural gas product in the absorption zone and to thereby introduce or magnify difficulties from gas hydrate formation in high pressure gas distribution lines. The water present in the mineral oil is dissolved, or at least is dispersed in the oil so that it is not separable by ordinary means such as gravity separators.

It has been observed that the water present in the absorption oil and released in the absorption zone of apparatus of the conventional type will raise the water content or dew point temperature with respect to water of the denuded gas to such an extent that even where the gas fed into the system has a dew point temperature sufficiently low to prevent or minimize the difficulties enumerated above, i. e., corrosion, hydrate formation and condensation of water, the gas released from the system will have a dew point temperature so high as to again introduce these hazards.

These difficulties can be avoided in a simple, efficient and economical manner according to the present invention by desiccating the absorption oil prior to entry into the absorption zone. The term desiccating as herein used signifies removal of a major portion of the moisture contained in the oil in solution as well as that in stable dispersion and is to be distinguished from mere removal, as by ordinary gravity separation, of water present in unstable suspensions in the oil. Such gravity separators do not disiccate the oil as required by the present process. Examples of systems incorporating this invention are illustrated in Figures 2 and 3 of the drawings.

In Figure 2, a hydrocarbon mixture, such as casing head gas, enters the system by way of inlet line 30 and passes through a cooler 31, scrubber 32 and line 33 to absorption tower 34. Cooler 31 may be of the atmospheric water cooled type.

Scrubber 32 removes water condensed by the cooler from the hydrocarbon gas. This cooling and scrubbing step increases the capacity of the absorption plant and is essential to the process where the moisture content of the entering gases is so high that the dehydrated absorption medium could not lower the dew point below that at which difficulties due to excess water might later occur in the distribution lines. Other methods of dehydrating the entering gas may be utilized such as extraction of the gas with diethylene glycol, a calcium chloride brine, glycerine, or the like. In general, it has been found more desirable to lower the dew point of the entering gas by the cooling and scrubbing or equivalent processes rather than to extract the necessary quantity of moisture from the gas with the dehydrated absorption medium.

The processed gas from absorber 34 passes through line 36 to a distribution system.

The absorbing medium, together with its dissolved liquefiable hydrocarbons, flows downwardly through the absorber tower to outlet line 37, through throttle valve 38, heat exchanger 39 and heater 40 to stripper column 41. Steam is admitted into the bottom of stripper column 41, through valve control line 42 and serves to distill from the absorption medium the liquefiable hydrocarbon constituents dissolved therein. The vaporized hydrocarbons pass from the top of stripper 41, through cooler 43 to a three-way separator 44 from which gaseous hydrocarbons are released by way of line 45, liquid phase hydrocarbons removed by line 46 and the condensed steam discharged through valve controlled line 47.

The denuded absorption oil passes from the bottom of stripper column 41 by way of line 48, to a mechanical separator 49 where unstably suspended or entrained water is separated and removed through valve controlled discharge line 50. The denuded absorption medium flows from the top of separator 49 by way of line 51 through heat exchanger 39 to pump 52 where the pressure is raised to that existing in the absorption zone. It is to be noted that at this point the absorption medium still contains water in an amount sufficient to introduce the hazard of hydrate formation in high pressure distribution lines if it should be contacted with the gas in the absorption zone. The absorption medium is pumped to refrigerating device 54 where the oil is cooled to a temperature sufficiently low to precipitate from solution in the oil a major proportion of water contained therein. Temperatures as low as desired may be utilized except that formation of ice crystals should be avoided. This refrigerating medium is admitted to cooling device 54 by line 55 and removed through line 53. From the refrigerating device the cooled absorption medium flows by way of line 56 to an electrical precipitator 57 of any well known suitable type. Leads 58 supply the necessary electrical potential to the precipitator. Water separated by the precipitator is discharged through line 59 and the desiccated absorption medium passed to absorption column 34 by way of line 60 where it again contacts the gaseous hydrocarbon mixture and extracts liquefiable constituents thereform.

The preferred embodiment of the invention illustrated diagrammatically in Figure 3 is similar to that illustrated in Figure 2, except for the method and means of desiccating the absorption medium. Casing head gas or the like is admitted to the system through line 70, passes through cooler 71 and scrubber 72, through conduit 73 to absorption tower 74 where liquefiable hydrocarbon constituents are extracted and the lean gas is discharged from the top of the absorber through line 75. The absorption medium, together with dissolved hydrocarbons, flows from the bottom of absorber 74, through line 76, throttling valve 77, heat exchanger 78 and heater 79 to stripper column 80. Steam is admitted to the stripper by way of valve controlled line 81, and vaporized hydrocarbons pass by way of conduit 82, condenser 83 to three-way separator 84. Vapor phase hydrocarbons, liquid phase hydrocarbons and condensed steam flow from separator 84 by way of lines 85, 86 and 87, respectively.

From the bottom of stripper column 80 the denuded absorption medium passes through conduit 88 to mechanical separator 89 from which the separated water is discharged by line 90 and the oil steam passes thence through pipe 91 to dehydrator 92.

The disiccating unit 92, together with the line supplying the dehydrating gas thereto, comprises the principal novel feature of this species of the invention and is shown in heavy lines to accentuate this fact. A small proportion of the gas discharged from absorber 74 is bled from conduit 75 through throttle valve 93 and line 94 to the bottom of dehydrating tower 92. The quantity of gas which it is necessary to by-pass through line 94 for the purposes of this invention comprises a very small fraction of the total gas treated by the system and is less than 2% thereof. In commercial installation 0.5% of the total gas treated has been found adequate to effect the results desired.

Desiccating tower 92 may comprise a conventional bubble cap distillation column or other suitable means for effecting intimate contact between the absorption medium and the dehydrating gas. A tower packed with Raschig rings or broken porcelain, or the like, comprises a suitable alternative apparatus.

A dry gas admitted to desiccating tower 92 serves to extract from the absorption medium a major proportion of the water contained therein, either as a stable dispersion or a true solution. The absorption medium is at a relatively high temperature, e. g., 325° F., by reason of the steam distillation operation in stripper 80, and the dehydrating gas admitted to the bottom of the column is an extremely effective medium for removing water, down to the last traces, from the oil as the gas flows countercurrently thereto and upwardly through the desiccating unit. The dehydrating gas, together with the water extracted from the absorption medium, flows from the top of desiccator 92, through cooler 95 to separator 96 where condensed water is removed and discharged by line 97. From the bottom of desiccator 92 the absorption medium from which at least a major proportion of its previously contained water has been removed passes to pump 98 by way of line 99, is raised to the pressure existing in the absorption zone and flows through heat exchanger 78 and cooler 100 to the top of absorption tower 74 where it again is contacted with the gaseous hydrocarbon mixture being treated.

In order to guide those skilled in the art in the practice of the invention, a specific example of the conditions maintained in the preferred form of the invention illustrated in Figure 3 is given.

The temperature of the inlet gas is lowered to approximately 55° F. in winter and to approximately 70 to 75° F. in the summer. Approximately 90 to 95% of the water contained in the stripped absorption oil is removed. The water content of the treated gas in such a system is below the permissible maximum and the corrosion water condensation and gas hydrate difficulties characteristic of high water content gases are eliminated. The desiccating unit may be operated at 15 lbs. per sq. in. gauge and at a temperature of 300 to 325° F. Approximately 5,000 cu. ft. of gas per day removes 95% of the water from the lean absorption oil required to process one million cu. ft. of plant intake gas, thus a plant intake volume of 30,000,000 cu. ft. per day requires recycling of only about 150,000 cu. ft. of gas, i. e., approximately 0.5% of the intake volume to remove 95% of the water content of the stripped absorption oil. The gas removed from the desiccating unit contains an appreciable amount of light oil fraction vaporized from the absorption oil. Removal of this fraction improves the lean oil vapor pressure and performance in the system. The dehydrating gas from the desiccating unit may be processed to remove the light absorption oil fractions, the volume of which may be in the order of 25 gals. per thousand cu. ft. of gas introduced into the desiccating unit. The temperature of the absorption oil is reduced about 15° F. upon passing through the desiccating column. This loss is due principally to vaporization of water and of the light oil fractions.

The desiccating column should be operated at the minimum pressure required to force the oil through the heat exchangers. It should be insulated both to maintain the temperature as high as possible within the unit and to conserve heat for release in the exchangers. The successful operation of the desiccating column is enhanced by removal of free water in an unstable emulsion form in the entering oil. It is therefore desirable that an efficient separator be present to remove entrained water from steam delivered to the main stripping column in order to maintain the quantity of free liquid phase water in the system at a minimum. An efficient separator to remove entrained water from the stripped oil prior to admission to the desiccator is also a desirable feature. High temperatures in the bottom of the stripper of the order of 320° F. are conducive to efficient desiccation.

The presence of undue amounts of moisture in gas line distributing systems increases the corrosion of the transmission lines. For the purpose of reducing corrosion it is generally desirable that the gas be dehydrated to a dew point not more than 10° F. above wet bulb temperature at plant discharge pressure. However, for wet bulb temperatures of 50° F. or below, dehydration to a dew point of 60° F. at plant discharge pressure will generally be adequate.

The invention in its broader aspects embraces various methods of desiccating the absorption oil, e. g., by contacting with chemical agents such as glycerine or other material having a marked affinity for water, prior to recirculation from a steam stripping unit through the absorber column. It should be observed that the problem of desiccating this oil arises only where the stripping unit embraces steam distillation or the absorption medium encounters water at some point in its circulation through the plant and carries such water into the absorption zone.

While the character of this invention has been described in detail in illustrative examples given, this has been done by way of illustration only and with the intention that no limitation should be imposed upon the invention thereby. It will be apparent to those skilled in the art that numerous modifications and variations may be effected in the practice of the invention, which is of the scope of the claims appended hereto.

We claim:

1. A process of preparing a hydrocarbon gas for circulation through high pressure distributing systems which comprises cooling said gas, scrubbing condensed moisture therefrom, passing said gas through an absorption zone wherein an absorption liquid is intimately contacted with said gas, removing the absorption liquid from said zone, stripping dissolved hydrocarbons from said absorption liquid by distillation in the presence of water vapor, passing said absorption liquid through a desiccating zone, passing a small portion of the gas discharged from the absorption zone through said desiccating zone in intimate contact with said absorption medium whereby a major portion of the water contained in the absorption medium is extracted therefrom, and returning the desiccated absorption medium to the absorption zone.

2. A process of preparing a hydrocarbon gas for circulation through high pressure distributing systems which comprises cooling said gas, scrubbing condensed moisture therefrom, passing said scrubbed gas through an absorption zone wherein an absorption liquid is intimately contacted with said gas, removing the absorption liquid from said zone, stripping dissolved hydrocarbons from said absorption liquid by distillation in the presence of water vapor, passing said absorption liquid through a desiccating zone while hot from said stripping operation, recirculating approximately 0.5% of the gas intake volume from the discharge of said absorption zone through said desiccating zone whereby a major portion of the water contained in the absorption medium is extracted therefrom, and returning the desiccated absorption medium to the absorption zone.

3. In a process of absorbing liquefiable hydrocarbons from a gaseous hydrocarbon mixture and simultaneously preparing the remaining hydrocarbon gas for circulation through high pressure distributing systems, in which process said gaseous hydrocarbon mixture is contacted with an absorption oil in an absorption zone to selectively dissolve liquefiable hydrocarbons from said mixture, the absorption oil containing said dissolved liquefiable hydrocarbons is subjected to stripping in contact with open steam to remove said dissolved liquefiable hydrocarbons and stripped absorption oil is returned to said absorption zone, the improvement of inhibiting the formation of gas hydrates in the gas unabsorbed in said absorption zone which comprises desiccating the stripped absorption oil prior to return to the absorption zone by passing a small portion of the gas discharged from the absorption zone in contact with said stripped absorption oil.

4. In a process of absorbing liquefiable hydrocarbons from a gaseous hydrocarbon mixture and simultaneously drying the remaining hydrocarbon gas for circulation through high pressure distributing systems, in which process said gaseous hydrocarbon mixture is contacted with an absorption oil in an absorption zone to selectively dissolve liquefiable hydrocarbons from said mixture, the absorption oil containing said dissolved liquefiable hydrocarbons is subjected to stripping in contact with open steam to remove said dissolved liquefiable hydrocarbons and stripped absorption oil is returned to said absorption zone, the improvement of removing moisture from the gas unabsorbed in said absorption zone which comprises desiccating the stripped absorption oil prior to return to the absorption zone by passing a substantially dry gas in contact with said stripped absorption oil.

5. A process of absorbing liquefiable hydrocarbons from a gaseous hydrocarbon mixture and simultaneously preparing the remaining hydrocarbon gas for circulation through high pressure distributing systems which comprises cooling said gaseous mixture, scrubbing condensed moisture therefrom, passing said scrubbed gas through an absorption zone wherein said gaseous mixture is intimately contacted with an absorption liquid to selectively dissolve liquefiable hydrocarbons from said mixture, stripping said absorption liquid in contact with open steam to remove said dissolved liquefiable hydrocarbons, and inhibiting reabsorption of water and formation of gas hydrates in the gas unabsorbed in said absorption zone by desiccating the stripped absorption liquid while hot from said stripping operation and prior to returning the absorption liquid to the absorption zone by intimately contacting said stripped absorption liquid with a hydrocarbon gas.

WALTER C. DAYHUFF.
ROBERT B. BOWMAN.